(12) United States Patent
Iizuka

(10) Patent No.: US 8,126,215 B2
(45) Date of Patent: Feb. 28, 2012

(54) REGISTRATION AND COLLATION OF A ROLLED FINGER BLOOD VESSEL IMAGE

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1076 days.

(21) Appl. No.: 11/703,691

(22) Filed: Feb. 8, 2007

(65) Prior Publication Data

US 2007/0217663 A1 Sep. 20, 2007

(30) Foreign Application Priority Data

Feb. 10, 2006 (JP) .................................. 2006-034170

(51) Int. Cl.
*G06K 9/00* (2006.01)
(52) U.S. Cl. ........................................ 382/115; 382/124
(58) Field of Classification Search .................... None
See application file for complete search history.

(56) References Cited

U.S. PATENT DOCUMENTS

| | | | |
|---|---|---|---|
| 6,289,114 B1 * | 9/2001 | Mainguet | 382/124 |
| 6,795,570 B1 * | 9/2004 | Eichhorn et al. | 382/124 |
| 6,898,301 B2 * | 5/2005 | Iwanaga | 382/124 |
| 6,950,540 B2 * | 9/2005 | Higuchi | 382/124 |
| 6,963,660 B1 * | 11/2005 | Tsukamura et al. | 382/124 |
| 7,110,579 B2 * | 9/2006 | Hashimoto | 382/124 |
| 7,194,115 B2 * | 3/2007 | Uchida | 382/124 |
| 7,197,168 B2 * | 3/2007 | Russo | 382/125 |
| 7,505,612 B2 * | 3/2009 | Ikeda | 382/124 |
| 7,613,334 B2 * | 11/2009 | Morgeneier et al. | 382/124 |
| 2004/0228508 A1 * | 11/2004 | Shigeta | 382/124 |
| 2005/0100200 A1 * | 5/2005 | Abiko et al. | 382/124 |
| 2005/0226479 A1 * | 10/2005 | Takahashi | 382/124 |
| 2008/0123905 A1 * | 5/2008 | Ito et al. | 382/115 |
| 2008/0144889 A1 * | 6/2008 | Abe | 382/115 |

FOREIGN PATENT DOCUMENTS

| | | | |
|---|---|---|---|
| JP | 2003-162722 | | 6/2003 |
| JP | 2004-178134 | | 6/2004 |
| JP | 2004-178134 A | * | 6/2004 |
| JP | 2004-23455 | | 8/2004 |
| JP | 2004-234355 A | * | 8/2004 |
| JP | 2004-246459 | | 9/2004 |
| JP | 2004-246459 A | * | 9/2004 |
| JP | 2006-012031 | | 1/2006 |
| JP | 2006-012031 A | * | 1/2006 |
| WO | WO 2004/026139 A1 | | 1/2004 |

OTHER PUBLICATIONS

Kono et al. (Dec. 2002) "Near-infrared finger vein patterns for personal identification." Applied Optics vol. 41 No. 35, pp. 7429-7436.*

* cited by examiner

*Primary Examiner* — Bhavesh Mehta
*Assistant Examiner* — Barry Drennan
(74) *Attorney, Agent, or Firm* — Finnegan, Henderson, Farabow, Garrett & Dunner, L.L.P.

(57) ABSTRACT

Apparatus, methods, and non-transitory computer-readable media for extracting biometric identification information useful for biometric authentication are disclosed. Biometric identification is accomplished by extracting binary biometric data from video signals of characteristics images of a subject of biometric identification such as a finger at sequentially different image pickup positions in response to a relative movement of an image pickup element and the subject of biometric identification at a predetermined biological site.

14 Claims, 10 Drawing Sheets

REGISTRATION AND COLLATION OF A ROLLED FINGER BLOOD VESSEL IMAGE

CROSS REFERENCE TO RELATED APPLICATIONS

The present invention contains subject matter related to Japanese Patent Application JP 2006-034170 filed in the Japanese Patent Office on Feb. 10, 2006, the entire contents of which being incorporated herein by reference.

BACKGROUND OF THE INVENTION

1. Field of the Invention

This invention relates to a registration program, a collation program, an extraction method and an extraction program that can suitably be applied to biometric authentications.

2. Description of the Related Art

Authentication apparatus for typically managing a plurality of fingerprints as biometric identification information and collating the fingerprint of the subject of authentication within the plurality of fingerprints to judge if the subject is the registered person or not have been proposed for the purpose of biometrics authentications (see, for example, Jpn. Pat. Appln. Laid-Open Publication No. 2003-162722).

SUMMARY OF THE INVENTION

However, with such authentication apparatus, if the biometric identification information (fingerprint) of a person that is registered in advance is stolen and an image prepared from the stolen biometric identification information (fingerprint) is put on the image pickup camera of authentication apparatus, the apparatus can erroneously judge that the third person who puts the fingerprint on the camera is the right user to degrade the reliability of the authentication accuracy.

In view of the above-identified problem, it is therefore desirable to provide a registration apparatus, a collation apparatus, an extraction method and an extraction program that can improve the reliability of authentication accuracy.

According to as aspect of the present invention, there is provided a registration apparatus including: an extraction means for extracting characteristics of a subject of biometric identification at every predetermined period as a characteristics image on the basis of the video signals output from an image pickup element as a result of picking up images of the subject of biometric identification at sequentially differentiated image pickup position in response to a relative movement of the image pickup element and the subject of biometric identification at a predetermined biological site; a degree of similarity detection means for detecting the degree of similarity between the characteristics image currently being processed and the characteristics image processed immediately before the characteristics image currently being processed or the characteristics image to be processed next to the characteristics image currently being processed; and a registration means for registering the characteristics image currently being processed as biometric identification information when the degree of similarity is not lower than a threshold value.

Thus, with a registration apparatus having a configuration as defined above, if a fraudulent image obtained by a fraudulent act of stealing biometric identification information is put on the image pickup camera of the authentication system, the fraudulent act does not have any continuity and it is not possible for the registration apparatus to detect any continuity thereof so that it is possible to prevent a fraudulent image obtained by a fraudulent act from being registered as biometric identification information to improve the reliability of authentication using biometric identification information.

In another aspect of the present invention, there is provided a collation apparatus including: an extraction means for extracting characteristics of a subject of biometric identification at every predetermined period as a characteristics image on the basis of the video signals output from an image pickup element as a result of picking up images of the subject of biometric identification at sequentially differentiated image pickup positions in response to a relative movement of the image pickup element and the subject of biometric identification at a predetermined biological site; a degree of similarity detection means for detecting the degree of similarity between the characteristics image currently being processed and the characteristics image processed immediately before the characteristics image currently being processed or the characteristics image to be processed next to the characteristics image currently being processed for each of the extracted characteristics images; and a collation means for collating the characteristics image currently being processed in a plurality of registered characteristics images registered as biometric identification information when the degree of similarity is not lower than a threshold value.

Thus, with a collation apparatus having a configuration as defined above, if a fraudulent image obtained by a fraudulent act of stealing biometric identification information is put on the image pickup camera of the authentication system, the fraudulent action does not have any continuity and it is not possible for the collation apparatus to detect any continuity thereof so that it is possible to prevent a fraudulent image obtained by a fraudulent act from being misjudged as an image of a proper user to improve the reliability of collation of using biometric identification information.

In still another aspect of the present invention, there is provided an extraction method including: a first step of extracting characteristics of a subject of biometric identification at every predetermined period as a characteristics image on the basis of the video signals output from an image pickup element as a result of picking up images of the subject of biometric identification at sequentially differentiated image pickup positions in response to a relative movement of the image pickup element and the subject of biometric identification at a predetermined biological site; a second step of detecting the degree of similarity between the characteristics image currently being processed and the characteristics image processed immediately before the characteristics image currently being processed or the characteristics image to be processed next to the characteristics image currently being processed; and a third step of picking up the characteristics image currently being processed as subject of registration or subject to be compared with the subject of registration when the degree of similarity is not lower than a threshold value.

Thus, with an extraction method as defined above, if a fraudulent image obtained by a fraudulent action of stealing biometric identification information is put on the image pickup camera of the authentication system, the fraudulent action does not have any continuity and it is not possible for the extraction method to detect any continuity thereof so that it is possible to prevent a fraudulent image obtained by a fraudulent action from being registered as biometric identification information or misjudged as an image of a proper user to improve the reliability of authentication using biometric identification information.

In still another aspect of the present invention, there is provided a program for causing a computer to execute: extracting characteristics of a subject of biometric identification at every predetermined period as a characteristics image on the basis of the video signals output from an image pickup element as a result of picking up images of the subject of biometric identification at sequentially differentiated image pickup positions in response to a relative movement of the image pickup element and the subject of biometric identification at a predetermined biological site; detecting the degree of similarity between the characteristics image currently being processed and the characteristics image processed immediately before the characteristics image currently being processed or the characteristics image to be processed next to the characteristics image currently being processed; and picking up the characteristics image currently being processed as subject of registration or subject to be compared with the subject of registration when the degree of similarity is not lower than a threshold value.

Thus, with a program as defined above, if a fraudulent image obtained by a fraudulent action of stealing biometric identification information is put on the image pickup camera of the authentication system, the fraudulent action does not have any continuity and it is not possible for the program to detect any continuity thereof so that it is possible to prevent a fraudulent image obtained by a fraudulent action from being registered as biometric identification information or misjudged as an image of a proper user to improve the reliability of authentication using biometric identification information.

Thus, according to the present invention, there are provided a registration apparatus, a collation apparatus, an extraction method and an extraction program with which, if a fraudulent image obtained by a fraudulent action of stealing biometric identification information is put on the image pickup camera of the authentication system, it is possible to prevent the fraudulent image obtained by a fraudulent action from being registered as biometric identification information and misjudged as an image of a proper user to improve the reliability of authentication using biometric identification information.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

Now, an embodiment of the present invention will be described in greater detail by referring to the accompanying drawings.

(1) Overall Configuration of Authentication Apparatus of Embodiment

Figure 1:
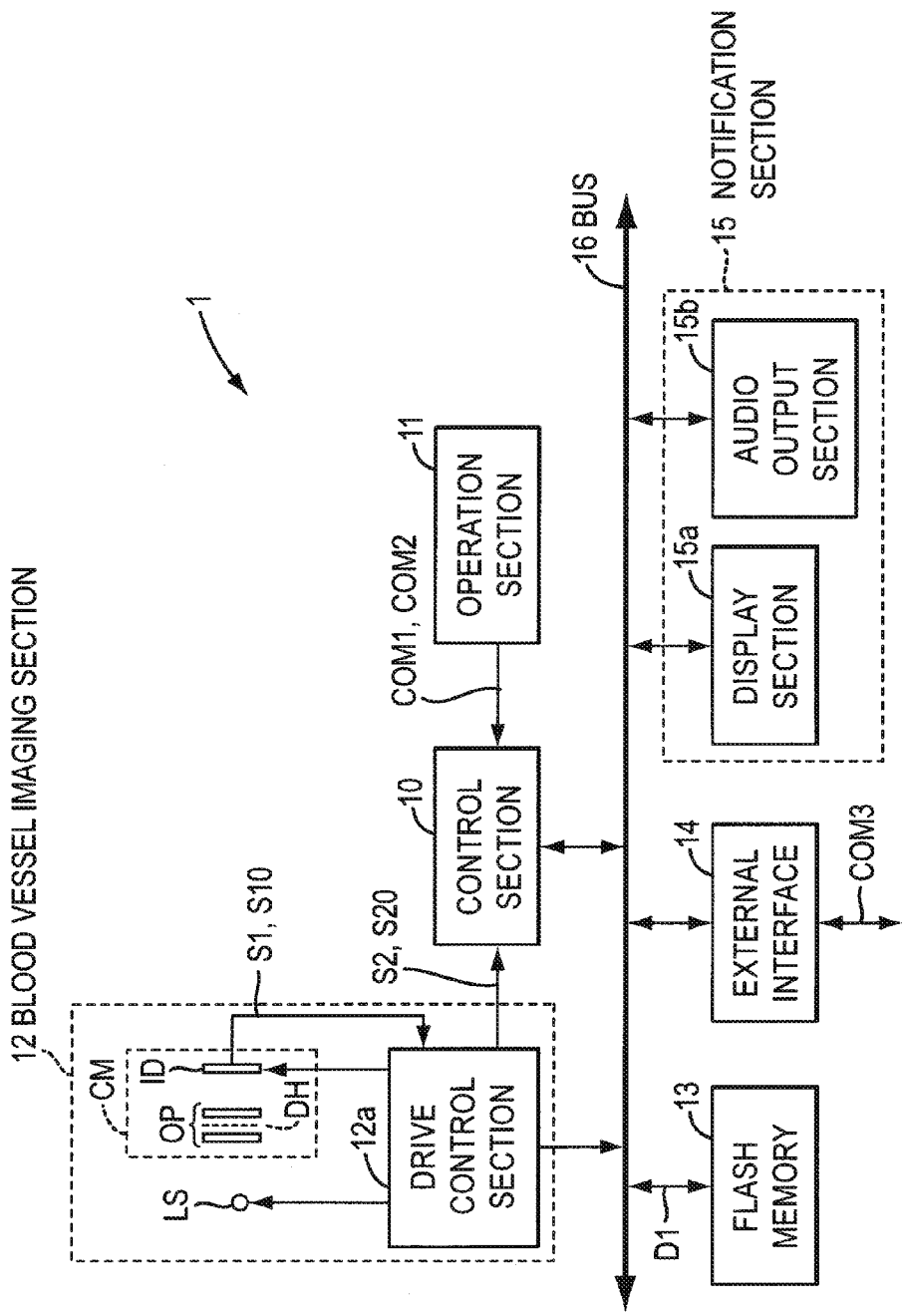
FIG. 1 is a schematic block diagram of an authentication apparatus according to an embodiment of the present invention, showing the overall configuration thereof.

FIG. 1 is a schematic block diagram of an authentication apparatus 1 according to the embodiment of the present invention, showing the overall configuration thereof. Referring to FIG. 1, the authentication apparatus 1 includes a control section 10, an operation section 11, a blood vessel imaging section 12, a flash memory 13, an interface 14 for exchanging data with the outside (to be referred to as external interface hereinafter), a notification section 15 and a bus 16, the operation section 11 through the notification section 15 being connected to the control section 10 by way of the bus 16.

The control section 10 is realized by a microcomputer that includes a Central Processing Unit (CPU) for controlling the entire authentication apparatus 1, a Read Only Memory (ROM) storing various programs and set information and a Random Access Memory (RAM) that operates as work memory for the CPU.

The control section 10 is adapted to receive execution command COM1 in a mode (to be referred to as blood vessel registration mode hereinafter) for registering blood vessels of the user to be registered (to be referred to as person to be registered hereinafter) or execution command COM2 in a mode (to be referred to as authentication mode hereinafter) for judging if the person is the right person to be registered or not from the operation section 11 according to a user's operation.

Then, the control section 10 selects a mode of operation according to the execution command COM1 or the execution command COM2 and operates either in the blood vessel registration mode or in the authentication mode according to the program that corresponds to the selected mode, appropriately controlling the blood vessel imaging section 12, the flash memory 13, the external interface 14 and the notification section 15.

(1-1) Blood Vessel Registration Mode

Specifically, when the blood vessel registration mode is selected as mode of operation, the control section 10 moves its mode of operation to the blood vessel registration mode and controls the blood vessel imaging section 12.

Then, the drive control section 12a of the blood vessel imaging section 12 controls and drives the one or more than one near infrared ray source LS for irradiating the finger placed at a predetermined position in the authentication apparatus 1 with near infrared rays and the image pickup element ID of the image pickup camera CM, which may typically be a Charge Coupled Device (CCD).

As a result, in the blood vessel imaging section 12, the near infrared rays irradiated onto the finger pass through the inside of the finger, where they are reflected and scattered, and subsequently enter the image pickup element ID by way of an optical system OP and a diaphragm DH as rays for projecting blood vessels of the finger (to be referred to as blood vessel projecting rays hereinafter). The image pickup element ID operates on the blood vessel projecting rays for photoelectric conversion and outputs the outcome of photoelectric conversion to the drive control section 12a as video signal S1.

Some of the near infrared rays irradiated onto the finger are reflected by the surface of the finger before entering the image pickup element ID. Therefore, the image of the video signal S1 output from the image pickup element ID includes not only the blood vessels in the finger but also the profile and the finger print of the finger.

The drive control section 12a adjusts the lens position of the optical lens of the optical system OP so as to bring the blood vessels in the finger into focus and at the same time the aperture value of the diaphragm DH so as to regulate the quantity of incident rays entering the image pickup element ID to an appropriate level. Then, the drive control section 12a supplies the video signal S2 output from the image pickup element ID after the adjustment to the control section 10.

The control section 10 extracts the characteristics of the blood vessel contained in the image of the video signal S2 and stores and registers the extracted characteristics of the blood vessel in the flash memory 13 as information for identifying the person to be registered (to be referred to as person to be registered identification data hereinafter) D1.

Thus, the control section 10 operates in the blood vessel registration mode in the above-described way.

(1-2) Authentication Mode

On the other hand, when the control section 10 selects the authentication mode as the mode of operation, it moves its mode of operation to the authentication mode and controls the blood vessel imaging section 12 as in the above-described blood vessel registration mode.

Then, the blood vessel imaging section 12 controls and drives the near infrared ray source LS and the image pickup element ID. At the same time, the blood vessel imaging section 12 adjusts the lens position and the aperture value of the diaphragm DH of the optical lens of the optical system OP according to the video signal S10 output from the image pickup element ID and supplies the video signal S20 output from the image pickup element ID after the adjustment to the control section 10.

The control section 10 extracts the characteristics of the blood vessels contained in the image of the video signal S20 as in the case of the above-described blood vessel registration mode and, at the same time, reads out the person to be registered identification data D1 registered in the flash memory 13. Then, the control section 10 collates the extracted characteristics of the blood vessels and the characteristics of the blood vessels of the person to be registered identification data D1 and judges if the user who placed the finger is the person to be registered (proper user) or not according to the degree of agreement obtained as a result of the collation.

If the control section 10 judges that the finger belongs to the person to be registered, it generates execution command COM3 for causing an operation processing apparatus (not shown) connected to the external interface 14 to perform a predetermined operation and transfers the command to the operation processing apparatus by way of the external interface 14.

If the operation processing apparatus connected to the external interface 14 is a locked door, the control section 10 may transfer execution command COM3 for unlocking the door to the door. If the operation processing apparatus is a computer having a plurality of operation modes, some of which are prohibited, the control section 10 may transfer execution command COM3 for releasing the prohibited operation modes.

While two specific examples are listed above for the operation processing apparatus, the embodiment is by no means limited thereto. In other words, the operation processing apparatus may be any other apparatus compatible with the embodiment. While the operation processing apparatus is connected to the external interface 14 of this embodiment, the software or hardware of the operation processing apparatus may be installed in the authentication apparatus 1.

If, on the other hand, the control section 10 judges that the finger does not belong to the person to be registered, it displays so by way of the display section 15a of the notification section 15 and outputs an audio sound by way of the audio output section 15b of the notification section 15 so as to visibly and audibly issue a notification that the finger does not belong to the person to be registered.

Thus, the control section 10 operates in the authentication mode in the above-described way.

(2) Finger Imaging Method

Figure 2:
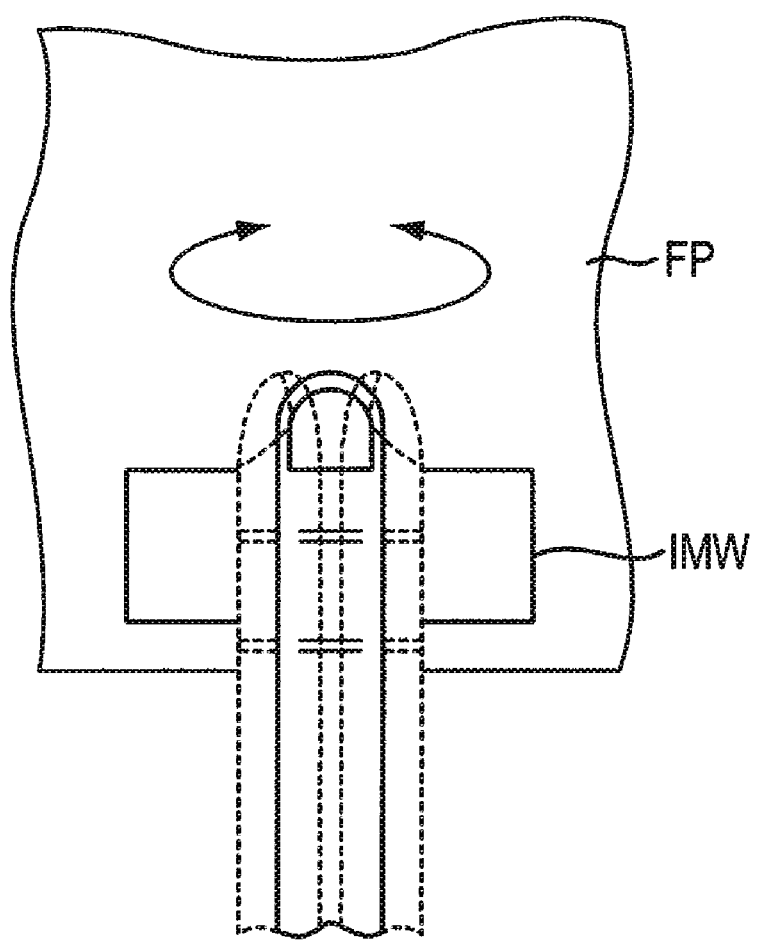
FIG. 2 is a schematic illustration of a finger to be placed on the embodiment of FIG. 1.

A technique of successively imaging a finger is employed for the authentication apparatus 1 of this embodiment. More specifically, the authentication apparatus 1 has a plane for placing a finger (to be referred to as finger placing plane hereinafter) FP as shown in FIG. 2 and the imaging window IMW that is a colorless transparent member arranged on the finger placing plane FP provides a finger placing position.

The image pickup camera CM (FIG. 1) of the blood vessel imaging section 12 is arranged below the imaging window IMW. When an image of a finger is picked up in the blood vessel registration mode or in the authentication mode, the user places one of his or her fingers on the image pickup camera (imaging window) and rolls it along the curved surface of the finger from one of its lateral sides to the other, constantly keeping its surface in contact with the imaging window IMW.

The finger that is being rolled is successively shot by the image pickup camera CM at predetermined regular intervals. Thus, s a result of the image pickup operation, a number of video signals are sequentially output from the image pickup camera CM.

(3) Relationship Between Image Pickup Position and Picked Up Image

The images of the video signals show blood vessels that are the subject of biometric identification shot successively at different image pickup positions along the curved surface of the finger. Therefore, same blood vessels will appear differently in the images.

The difference of appearance of same blood vessels will be less remarkable between any two images that are picked up successively (and hence they are highly similar to each other) (FIG. 4A and FIG. 4B, FIG. 4B and FIG. 4C, FIG. 4C and FIG. 4D, and FIG. 4D and FIG. 4E) but more remarkable between any two images that are picked up at a long time interval (and hence they are less similar to each other).

Differently stated, when two images picked up at a short time interval are highly similar to each other, it is safe to say that they are picked up from a same finger that is being rolled because they show continuity. When, on the other hand, the two images that are picked up at a short time interval does not show any change during the time interval or when two images picked up at a short time intervals are poorly similar to each other, it is safe to say that they are not picked up from a same finger that is being rolled and may be obtained by a fraudulent act, which may be placing a fraudulent image obtained from stolen biometric identification information on the image pickup camera, because they does not show any continuity.

(4) Specific Processing Operation of Control Section (4-1) Specific Processing Operation in Blood Vessel Registration Mode The authentication apparatus 1 operates to register a plurality of images obtained as a result of shooting blood vessels at different image pickup positions, checking if the blood vessels included in the images show continuity or not, in the blood vessel registration mode.

Figure 5:
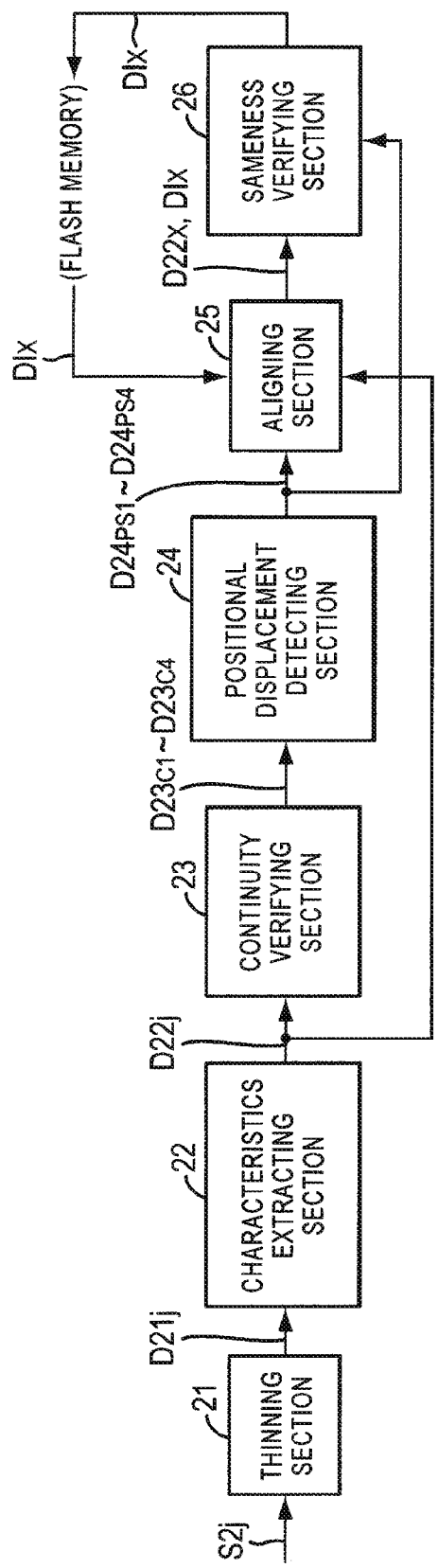
FIG. 5 is a schematic block diagram of the control section of the embodiment of FIG. 1, illustrating the processing operation thereof in a blood vessel registration mode.

FIG. 5 is a schematic block diagram of the control section 10 of the authentication apparatus of this embodiment, illustrating the processing operation thereof in a blood vessel registration mode. As shown in FIG. 5, the control section 10 is functionally divided into a thinning section 21, a characteristics extracting section 22, a continuity verifying section 23, a positional displacement detecting section 24, an aligning section 25 and a sameness verifying section 26. Each of these sections will be discussed below in detail.

After the lens position and the aperture value of the diaphragm DH of the optical system OP of the blood vessel imaging section 12 (FIG. 1) are adjusted, the thinning section 21 receives as input video signals S2J (J=1, 2, 3, . . . , P (P=integer)) at predetermined regular time intervals from the image pickup element ID.

Then, the thinning section 21 executes an Analog/Digital (A/D) conversion process on the video signals S2$j$ and thins the obtained video data to put away every predetermined number of images at predetermined intervals.

The video data D21$j$ (j=1, 2, 3, . . . , p (p=integer)) that are left after the thinning operation are then sequentially sent out to the characteristics extracting section 22. For the purpose of convenience of explanation, it is assumed here that five video signals S21$j$ (D21$_1$ through D21$_5$) are sequentially sent to the characteristics extracting section 22.

Then, the characteristics extracting section 22 executes predetermined image processes including a profile extracting process such as sobel-filtering process, a smoothing process such as Gaussian-filtering process, a binarization process and a thinning process to extract characteristics of the blood vessels contained in the images of the video data D21$j$.

Thereafter, the characteristics extracting section 22 sends the data of the binary images (to be referred to as binary video data hereinafter) D22$j$ (D22$_1$ through D22$_5$) obtained as a result of the image processes to the continuity verifying section 23 and the aligning section 25.

Figure 6A:
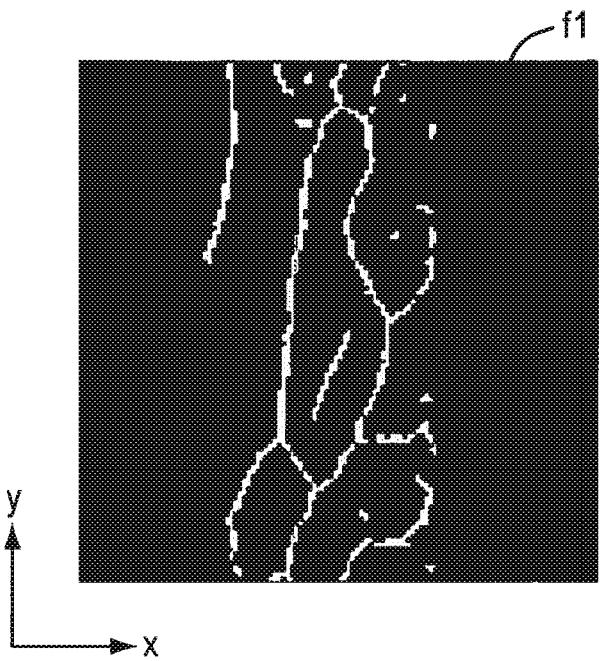
FIGS. 6A and 6B are schematic illustrations of an operation of computationally determining a correlation value and the quantity of a positional displacement.
Figure 6B:
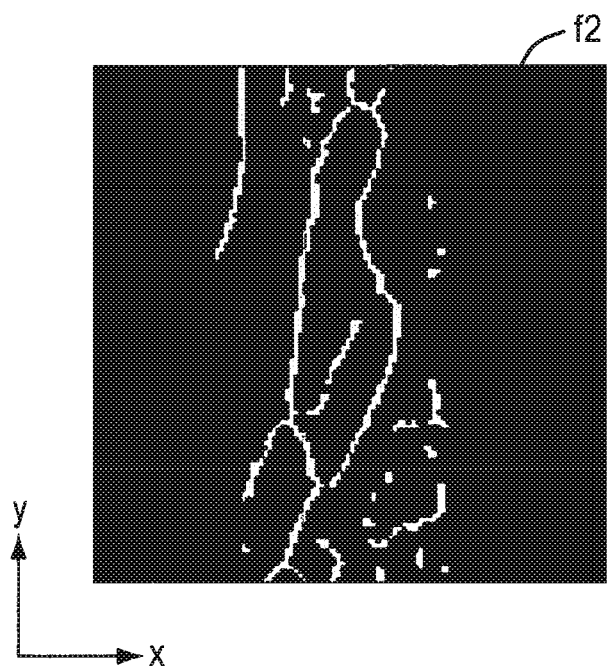

The continuity verifying section 23 computationally determines the correlation values C1 through C4 respectively between the binary images IM2 and IM1, between the binary images IM3 and IM2, between the binary images IM4 and IM3 and between the binary images IM5 and IM4, or between the binary image of each subject of processing at current time (to be referred to as subject of current processing) and the binary images of the subject of immediately preceding processing as shown in FIG. 6.

More specifically, if the binary image that is the subject of current processing is f1 and the binary image that is the subject of immediately preceding processing is f2, while the image size of the binary images f1 and f2 is M row and N columns and the pixels are (m, n). The continuity verifying section 23 computationally determines the correlation value S (f1, f2) between the binary images f1 and f2 by means of the formula shown below.

[formula 1]

$$S(f1, f2) = \frac{\sum_{m=0}^{M-1}\sum_{n=0}^{N-1} f1(m,n)f2(m,n)}{\sqrt{\left\{\sum_{m=0}^{M-1}\sum_{n=0}^{N-1} f1(m,n)^2\right\}} \sqrt{\left\{\sum_{m=0}^{M-1}\sum_{n=0}^{N-1} f1(m,n)^2\right\}}} \quad (1)$$

When the computationally determined correlation value is not smaller than a predefined first threshold value, it means that the images are highly probably obtained from a finger that is actually being rolled. Then, the continuity verifying section 23 executes the following processes because the images show continuity.

When, on the other hand, the computationally determined correlation value is smaller than the first threshold value, it means that the images are highly probably not obtained from a finger that is actually being rolled but produced by a fraudulent act. Then, the continuity verifying section 23 suspends the following processes because the images do not show continuity and tells the user to register blood vessels once again by way of the notification section 15 (FIG. 1).

Figure 7:
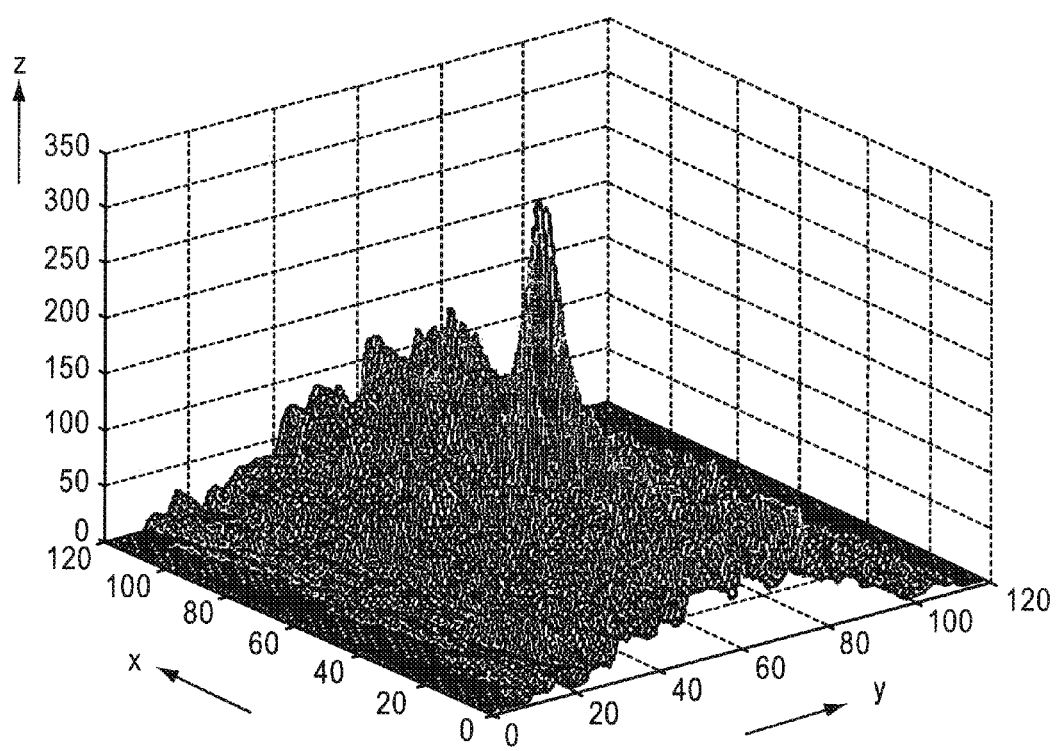
FIG. 7 is a schematic illustration of correlation distribution.

Additionally, the continuity verifying section 23 generates a correlation distribution graph typically as shown in FIG. 7 for each of the combinations of binary images IM2 and IM1, IM3 and IM2, IM4 and IM3 and IM5 and IM4 on the basis of the outcome of the computationally determined correlation values C1 through C4.

Then, the continuity verifying section 23 sends the data on the correlation distribution (to be referred to as correlation distribution data hereinafter) D23 (D23$_{C1}$, D23$_{C2}$, D23$_{C3}$, D23$_{C4}$) to the positional displacement detecting section 24.

The positional displacement detecting section 24 detects the positional displacement quantities PS1 through PS4 (FIG. 6) of the peak positions in the direction of rolling the finger (in the x-direction in this embodiment) relative to the position of the center of gravity according to the correlation distributions of the correlation distribution data D23 (D23$_{C1}$, D23$_{C2}$, D23$_{C3}$, D23$_{C4}$) and sends the positional displacement quantities PS1 through PS4 to the aligning section 25 and the sameness verifying section 26 as data (to be referred to as positional displacement quantity data hereinafter) D24 (D24$_{PS1}$, D24$_{PS2}$, D24$_{PS3}$, D24$_{PS4}$).

In the instance of correlation distribution shown in FIG. 7, the positional displacement quantity is expressed by the gap between the center of gravity that corresponds to the "0" position on the x-axis and the peak position on the x-axis.

The aligning section 25 aligns the binary images according to the positional displacement quantities of the binary video data D22$x$ of each of the subjects of current processing (FIG. 5) and one or more than one images of the binary video data that precede the binary video data D22$x$ and are already temporarily registered in the flash memory 13 (FIG. 1) (to be referred to as temporarily registered binary video data hereinafter) D1$x$ (FIG. 5).

When, for instance, the first binary video data D22$_1$ is supplied from the characteristics extracting section 22, the aligning section 25 recognizes the binary video data D22$_1$ as the binary video data D22$x$ of the subject of current processing. However, since the characteristics extracting section 22 does not have any temporarily registered binary video data $D1_x$ that precedes the binary video data D22x ($D22_1$), it simply sends the binary video data D22x ($D22_1$) to the sameness verifying section 26.

When, for instance, the second binary video data $D22_2$ is supplied from the characteristics extracting section 22 and the first binary video data $D22_1$ is already temporarily registered, the aligning section 25 recognizes the binary video data $D22_2$ as the binary video data D22x of the subject of current processing and, at the same time, reads out the binary video data D1x ($D22_1$) from the flash memory 13.

Then, the aligning section 25 determines if the positional displacement quantity PS1 between the binary image IM2 and the binary image IM1 (FIG. 6) is greater than a predetermined threshold value (to be referred to as first displacement threshold value hereinafter) or not according to the positional displacement quantity data $D24_{PS1}$ that corresponds to the two binary video data $D22_2$ and $D22_1$.

If the positional displacement quantity PS1 is not greater than the first displacement threshold value, it means that the quantity of movement from the image pickup position that corresponds to the binary video data D22x ($D22_2$) of the subject of current processing to the image pickup position that corresponds to the temporarily registered binary video data D1x ($D22_1$) is insufficient. In this case, the aligning section 25 assumes that the finger that is the subject of imaging is sitting still and discards the binary video data D22x ($D22_2$) of the subject of current processing and selects the binary video data $D22_3$ that is supplied third from the characteristics extracting section 22 for the subject of current processing.

If, on the other hand, the positional displacement quantity PS1 is greater than the first displacement threshold value, it means that the any of movement from the image pickup position that corresponds to the binary video data D22x ($D22_2$) to the image pickup position that corresponds to the temporarily registered binary video data D1x ($D22_1$) is sufficient. In this case, the aligning section 25 assumes that the finger that is the subject of imaging is rolling and aligns the binary images IM2 and IM1 (FIG. 6) according to the positional displacement quantity PS1 (FIG. 6).

When the fourth binary video data $D22_4$ is supplied from the characteristics extracting section 22 and the preceding first through third binary video data $D22_1$ through $D22_3$ are already selected as subjects of temporary registration, the aligning section 25 recognizes the binary video data $D22_4$ as the binary video data D22x of the subject of current processing and reads out the temporarily registered binary video data D1x ($D22_1$ through $D22_3$) from the flash memory 13.

Then, the aligning section 25 determines the quantity of positional displacement PS3 (FIG. 6) between the binary image IM4 that is the subject of current processing (FIG. 6) and the binary image IM3 that is the subject of immediately preceding processing (FIG. 6) is not smaller than a predetermined threshold value (to be referred to as first displacement threshold value) or not.

If the quantity of positional displacement is smaller than the first displacement threshold value, the aligning section 25 discards the binary video data D22x ($D22_4$) of the subject of current processing and selects the fifth binary video data $D22_5$ supplied from the characteristics extracting section 22 for the subject of current processing.

If, on the other hand, the quantity of positional displacement is not smaller than the first displacement threshold value, the aligning section 25 aligns the binary images IM4 and IM3 according to the positional displacement quantity PS3 between the binary images IM4 and IM3 and it also aligns the binary images IM4 and IM2 according to the positional displacement quantity between the binary images IM4 and IM2 (the sum of PS3 and PS2) and the binary images IM4 and IM1 according to the positional displacement quantity between the binary images IM4 and IM1 (the sum of PS3, PS2 and PS1).

Thus, when there is a positional displacement not smaller than the first displacement threshold value between the binary image that is the subject of current processing and the immediately preceding binary image that is temporarily registered, the aligning section 25 aligns the binary image that is the subject of current processing with all the temporarily registered binary images.

Additionally, when the aligning section 25 aligns the binary images in this way, it sends the binary video data D22x of the subject of current processing and the temporarily registered binary video data D1x to the sameness verifying section 26.

When the aligning section 25 supplies only the binary video data D22x and hence the binary video data D22x is the first binary video data $D22_1$, the sameness verifying section 26 temporarily registers the binary video data $D22_1$ as temporarily registered binary video data D1x in the flash memory 13 (FIG. 1) because it does not have any image to be verified for sameness with the image of the binary video data $D22_1$.

When, on the other hand, the aligning section 25 supplies the binary video data D22x and the temporarily registered binary video data D1x, the sameness verifying section 26 detects the degree of similarity between the binary images.

More specifically, the sameness verifying section 26 computationally determines the correlation value of the binary video data D22x and the temporarily registered binary video data D1x typically by means of the formula (1) and determines if the computed correlation value is not smaller than a predefined second threshold value or not.

This second threshold value is defined to be greater than the first threshold value that the continuity verifying section 23 uses. This is because the first threshold value is a reference for judging if images show any continuity before they are aligned and almost all images may be judged as those that do not show any continuity if a large value is selected for the first threshold value, whereas the second threshold value is a reference for judging if images show sameness after they are aligned so that the False Acceptance Rate (FAR) will become high and the authentication accuracy will fall unless a relatively large value is selected for the second threshold value.

If the computationally determined correlation value is smaller than the second threshold value, the sameness verifying section 26 judges that the binary image data are not obtained from a same finger of a same person and then erases all the temporarily registered binary video data D1x that are already registered in the flash memory 13 (FIG. 1). At the same time, the sameness verifying section 26 suspends all the succeeding processes and tells the user to register blood vessels once again by way of the notification section 15 (FIG. 1).

If, on the other hand, the computationally determined correlation value is not smaller than the second threshold value, the sameness verifying section 26 judges that the binary image data are obtained from a same finger of a same person and temporarily registers the supplied binary video data D22x in the flash memory 13 (FIG. 1) as temporarily registered binary video data D1x.

Then, the sameness verifying section 26 determines if the positional displacement quantity between the temporarily registered binary video data D22x and the binary video data $D22_1$ that is temporarily registered first, which is the positional displacement quantity PS1 when the binary image of the binary video data D22x is the second binary image IM2, the sum of the positional displacement quantities PS1 and PS2 when the binary image of the binary video data D22x is the third binary image IM3, the sum of the positional displacement quantities PS1, PS2 and PS3 when the binary image of the binary video data D22x is the fourth binary image IM4 and the sum of the positional displacement quantities PS1, PS2, PS3 and PS4 when the binary image of the binary video data D22x is the fifth binary image IM5, is not smaller than a predefined threshold value (to be referred to as second displacement threshold value hereinafter).

If the positional displacement quantity is smaller than the second displacement threshold value, it means that the quantity of movement from the image pickup position that corresponds to the binary video data D22x of the subject of current processing to the image pickup position that corresponds to the first binary video data $D22_1$ does not get to the quantity of movement from one of the lateral sides of the finger to the other. In this case, the sameness verifying section 26 continues the sameness verifying process.

If, on the other hand, the positional displacement quantity is not smaller than the second displacement threshold value, it means that the quantity of movement from the image pickup position that corresponds to the binary video data D22x of the subject of current processing to the image pickup position that corresponds to the first binary video data $D22_1$ has already got to the quantity of movement from one of the lateral sides of the finger to the other. In this case, the sameness verifying section 26 adopts the plurality of binary video data D1x that are temporarily registered in the flash memory 13 as biometric identification information D1 of the subject to be registered and tells the user that the blood vessel registration process is completed by way of the notification section 15 (FIG. 1).

In this way, the control section 10 registers a plurality of images obtained as a result of sequentially shooting blood vessels from different image pickup positions, verifying that the blood vessels included in the images show continuity or not.

(4-2) Registration Process Sequence

Now, the registration process sequence of the above-described control section 10 in the blood vessel registration mode will be described below by referring to the flowchart of FIG. 8.

As execution command COM 1 is given to the control section 10 from the optical section 11 (FIG. 1), the control section 10 controls the blood vessel imaging section 12 by way of the drive control section 12a (FIG. 1) as preprocessing and executes a thinning process and predetermined image processes on the video signals S2j that are sequentially obtained as a result of the image pickup operation of the blood vessel imaging section 12. Then, the control section 10 sequentially and temporarily holds the obtained binary video data D22j in a memory (not shown).

When the number of the binary video data D22j held in the memory exceeds a predetermined level, the control section 10 starts the registration process sequence RT1 at Step SP0, while continuing the preprocessing, and then in the next step, or Step SP1, temporarily registers the first binary image (binary image data $D22_1$) in the flash memory 13 (FIG. 1).

Subsequently in the next step, or Step SP2, the control section 10 selects the binary image held in the memory most early as a result of the current preprocessing as the binary image that is the subject of current processing and then in the next step, or Step SP3, it determines if the correlation value of the binary image that is the subject of current processing and the binary image that is the subject of immediately preceding processing is not smaller than the first threshold value or not.

If the correlation value is not smaller than the first threshold value, it means that the two binary images show continuity and are highly probably obtained from a rolling finger. If such is the case, therefore, the control section 10 determines if the positional displacement quantity of the binary image that is the subject of current processing and the binary image that is the subject of immediately preceding processing is not smaller than the first displacement threshold value or not in the next step, or Step SP4.

If the positional displacement quantity is not smaller than the first displacement threshold value, it means that the quantity of movement from the image pickup position corresponding to the binary image that is the subject of current processing to the image pickup position corresponding to the binary image that is the subject of immediately preceding processing is sufficient and hence the finger that is being shot is not sitting still. Therefore, in such a case, in the next step, or Step SP5, the control section 10 aligns the binary image that is the subject of current processing with all the binary images that have already been temporarily registered and then determines if the correlation value of the aligned binary images is not smaller than the second threshold value or not in Step SP6.

If the correlation value is not smaller than the second threshold value, it means that the picked up images are obtained from a rolling finger of a same person. Therefore in the next step, or Step SP7, the control section 10 temporarily registers the binary image that is selected as the subject of current processing in Step SP2 and in the next step, or Step SP8, it determines if the positional displacement quantity of the temporarily registered binary image and the binary image that is temporarily registered first is not smaller than the second displacement threshold value or not.

If the positional displacement quantity is not smaller than the second displacement threshold value, it means that the rolling finger has moved by a predetermined quantity of movement and an appropriate number of binary images that are picked up while the finger is moving and show continuity are registered. Therefore, the control section 10 properly registers the temporarily registered binary image as biometric identification information D1 in the next step, or Step SP9, and then proceeds to Step SP10 to end the registration process sequence RT1.

If, on the other hand, the positional displacement quantity obtained in Step SP4 is smaller than the first displacement threshold value or the positional displacement quantity obtained in Step SP8 is smaller than the second displacement threshold value, it means that the finger that is being shot is sitting still or the finger is rolling but at a very slow speed and hence has not moved by a predetermined quantity of movement yet. If such is the case, the control section 10 returns to Step SP2 and repeats the above processing steps.

If a fraudulent image obtained by stolen biometric identification information is placed on the image pickup camera, the loop from Step SP2 to Step SP4 is repeated and hence the fraudulent image is not registered.

If, on the other hand, the correlation value obtained in Step SP3 is smaller than the first threshold value or the correlation value obtained in Step SP6 is smaller than the second threshold value, it means that the images are not obtained from a rolling finger of a same person but produced by a fraudulent act. Then, if there are one or more than one temporarily registered binary images, the control section 10 erases them in the next step, or Step SP11 and then proceeds to Step S10 to end the registration process sequence RT1.

If a third person rolls one of his or her fingers and places a fraudulent image obtained from stolen biometric identification information on the image pickup camera or a plurality of fraudulent images obtained from stolen biometric identification information on the image pickup camera in an arbitrarily selected order on the way, such an act is detected in Step SP3 or Step SP6 and hence any fraudulent image is not registered at all.

Thus, the control section 10 operates in the blood vessel registration mode, following the registration process sequence RT1, in a manner as described above.

(4-3) Specific Processing Operation in Authentication Mode

Figure 9:
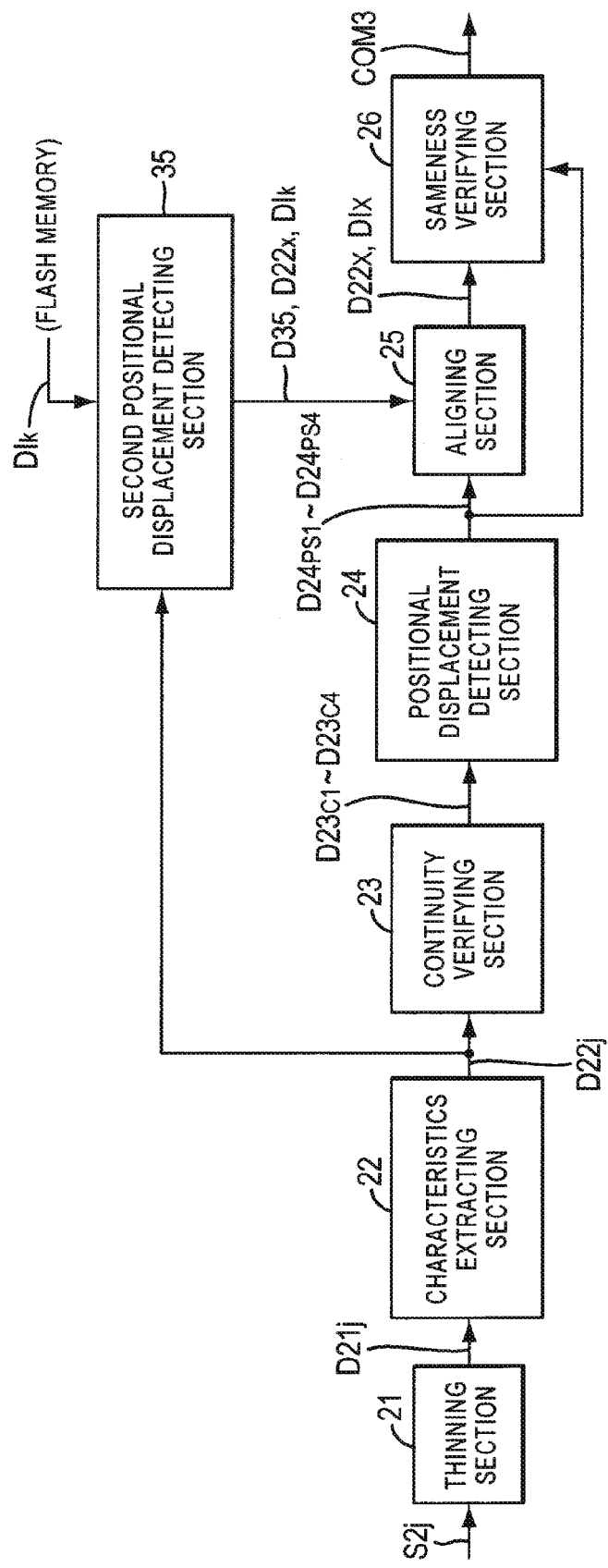
FIG. 9 is a schematic block diagram of the control section of the embodiment of FIG. 1, illustrating the processing operation thereof in an authentication mode.

Now, the specific processing operation of the control section 10 in the authentication mode will be described below. FIG. 9 is a schematic block diagram of the control section 10 of the authentication apparatus of this embodiment, illustrating the processing operation thereof in the authentication mode. In FIG. 9, the components that correspond to those of FIG. 5 are denoted respectively by the same reference symbols. Referring to FIG. 9, the control section 10 is functionally divided into a thinning section 21, a characteristics extracting section 22, a continuity verifying section 23, a first positional displacement detecting section 24, a second positional displacement detecting section 35, an aligning section 25 and a sameness verifying section 26.

The control section 10 of the authentication apparatus 1 of this embodiment commonly checks if the plurality of binary images obtained by sequentially picking up images of blood vessels at different image pickup positions show continuity or not both in the authentication mode and in the above-described blood vessel registration mode. However, the control section 10 aligns the binary images and detects the quantity of movement of the finger according to the positional displacement quantities ($D24_{PS1}$ through $D24_{PS4}$) of the binary image that is the subject of current processing ($D22sx$) and the binary images that are subjects of preceding processing ($D1x$) and temporarily registered in the blood vessel registration mode as shown in FIG. 5, whereas it detects the alignment according to the positional displacement quantities D35 of the binary image that is the subject of current processing ($D22x$) and the binary images that are already properly registered as biometric identification information D1 ($D1k$ (k=2, 3, ..., q (q=integer))) in the authentication mode as shown in FIG. 9.

The second position displacement detecting section 35, which is a functional processing section of the control section 10 that differentiates the blood vessel registration mode and the authentication mode will be described below in a case where there are five binary video data $D1k$ already registered properly as biometric identification information D1.

The second positional displacement detecting section 35 computationally determines the positional displacement quantities of the binary image of the binary video data $D22x$ that is the subject of current processing and the binary images of the registered binary video data $D1k$ (k=1 through 5) according to the correlation distributions of the binary images.

Then, the second positional displacement detecting section 35 sends the positional displacement quantities to the aligning section 25 as positional displacement quantity data $D35_{PS1}$ through $D35_{PS5}$ along with the binary video data $D22x$ of the subject of current processing and the registered binary video data $D1k$.

The aligning section 25 determines if there is a positional displacement not smaller than the first displacement threshold value between the binary image that is the subject of current processing and the binary image that is the subject of immediately preceding processing or not according to the positional displacement quantity data D24 supplied from the positional displacement quantity detecting section 24 in a manner as described above.

If there is a positional displacement not smaller than the first displacement threshold value, binary image of the binary video data $D22x$ of the subject of current processing and the binary images of the registered binary video data $D1k$ are aligned according to the corresponding positional displacement quantity data $D35_{PS1}$ through $D35_{PS5}$ and the binary video data $D22x$ and the registered binary video data $D1k$ that are aligned are sent to the sameness verifying section 26.

When all the correlation values of the binary video data $D22x$ and the registered binary video data $D1k$ are not smaller than the second threshold value, the sameness verifying section 26 judges that the subject whose finger is being shot is the registered right person and transfers the execution command COM3 for causing a predetermined operation to be performed to the operation processing apparatus by way of the external interface 14 (FIG. 1).

In this way, the control section 10 checks if the blood vessels included in the plurality of binary images obtained as a result of sequentially shooting the blood vessels from different image pickup positions show continuity or not and, if they show continuity, the control section 10 collates the binary image in the registered binary images.

(4-4) Authentication Process Sequence

Figure 8:
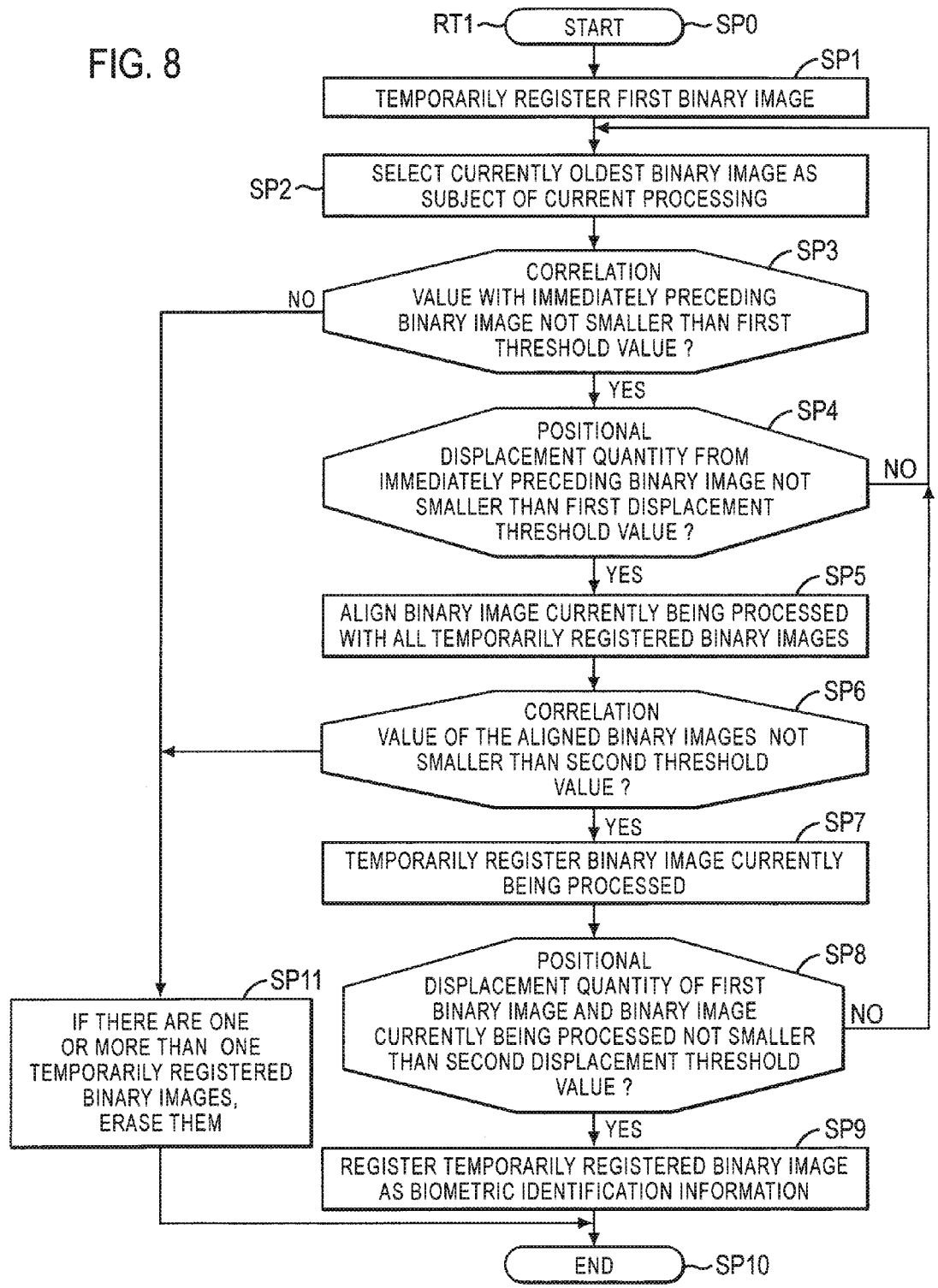
FIG. 8 is a flowchart of the registration process.

Now, the authentication process sequence that the control section 10 follows in the authentication mode will be described by referring to the flowchart of FIG. 10, where the components that correspond to those of FIG. 8 are denoted respectively by the same reference symbols.

Figure 10:
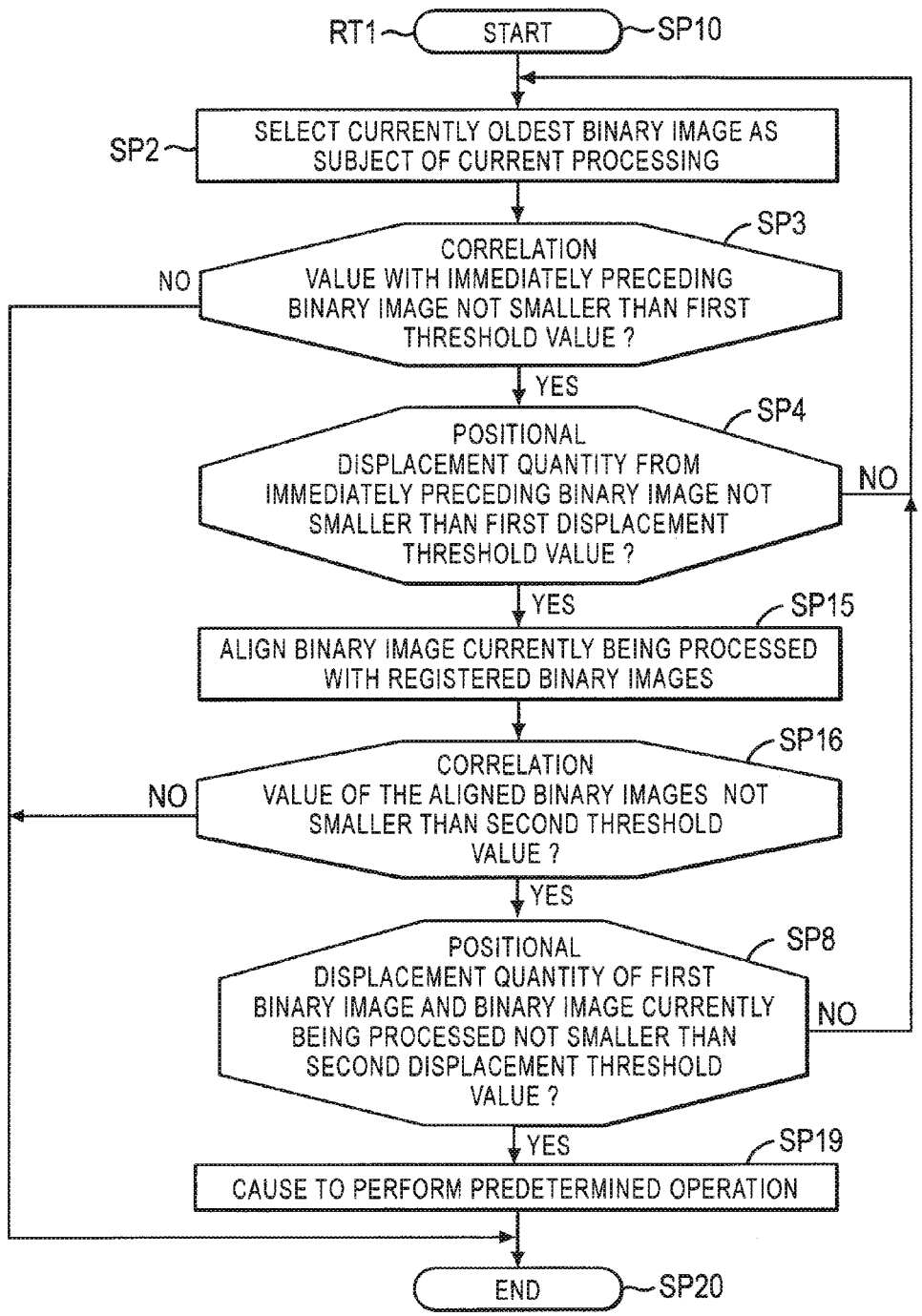
FIG. 10 is a flowchart of the authentication process.

As shown in FIG. 10, as execution command COM2 is given from the operation section 11 (FIG. 1), the control section 10 controls the blood vessel imaging section 12 by way of the drive control section 12a (FIG. 1) and, at the same time, executes a thinning process and predetermined image processes on the video signals $S20j$ (FIG. 9) sequentially given to it as a result of the image pickup operation of the blood vessel imaging section 12 as preprocessing. Then, it holds the obtained binary video data $D22j$ (FIG. 9) sequentially and temporarily in a memory (not shown).

When the number of binary video data $D22j$ held in the memory exceeds a predetermined level, the control section 10 starts the authentication process sequence RT2 at Step SP10, while continuing the preprocessing, and checks the continuity between the binary image that is the subject of current processing and the binary image that is the subject of immediately preceding processing as in the blood vessel registration mode. Subsequently, the control section 10 determines if the positional displacement quantity of the two binary images is not smaller than the first displacement threshold value of not.

If a correlation value not smaller than the first threshold value is obtained in Step SP4, the control section 10 aligns the binary image that is the subject of current processing and all the binary images registered in the flash memory 13 in Step SP15 and then determines if the correlation value of all the aligned binary images is not smaller than the second threshold value.

If the correlation value is not smaller than the second threshold value, it means that the picked up binary images are those of the registered person. Therefore, the control section 10 determines if the positional displacement quantity of the binary image that is the subject of current processing and the binary image that is registered first is not smaller than the second displacement threshold value in the next step, or Step SP8.

If the positional displacement quantity is not smaller than the second displacement threshold value, it means that the rolling finger has moved by a predetermined quantity of movement and an appropriate number of binary images that are picked up while the finger is rolling and show continuity have been registered. Therefore, in this case, the control section 10 causes the operation processing apparatus to perform a predetermined operation by means of an execution command COM3 (FIG. 1) in the next step, or Step SP19, then proceeds to Step SP20 to end the authentication process sequence RT2.

If, on the other hand, the positional displacement quantity obtained in Step SP4 is smaller than the first displacement threshold value or the positional displacement quantity obtained in Step SP8 is smaller than the second displacement threshold value, it means that the finger has not moved by the predetermined quantity of movement because the finger being shot is sitting still or the finger is moving very slowly and has not moved by the predetermined quantity of movement or for some other reason as described above for the blood vessel registration mode. Therefore, in this case, the control section 10 returns to Step SP2 and repeats the above-described processing steps.

If the correlation value obtained in Step SP3 is smaller than the first threshold value or the correlation value obtained in Step SP16 is smaller than the second threshold value, it means that the binary images obtained by the image pickup operation do not belong to the registered person. Therefore, in this case, the control section 10 proceeds to Step SP20 to end the authentication process sequence RT2.

Thus, the control section 10 operates in the authentication mode, following the authentication process sequence RT2, in a manner as described above.

(5) Operation and Effects

Figure 3:
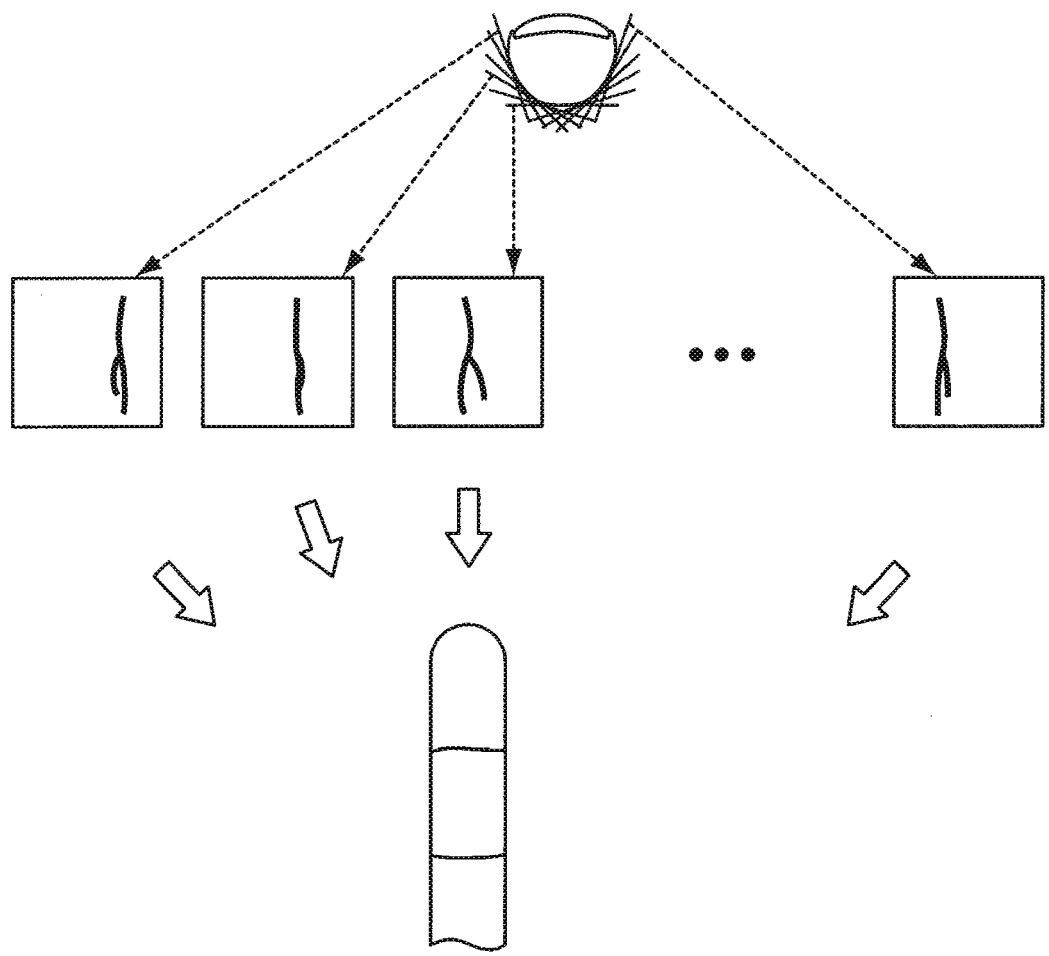
FIG. 3 is a schematic illustration of the relationship between the image pickup position and a subject (blood vessels) in an image.
Figure 4A:
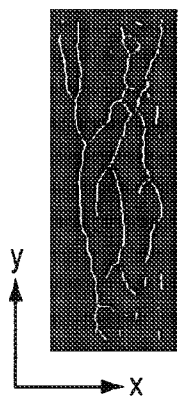
FIGS. 4A to 4E are schematic illustrations of the relationship between a temporal element and the state of blood vessels.
Figure 4B:
Figure 4C:
Figure 4D:
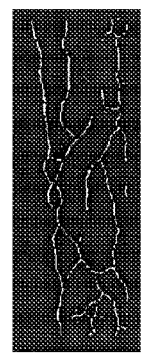
Figure 4E:
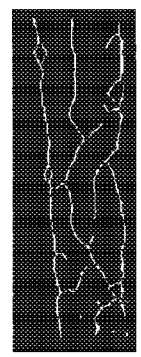

With the above-described arrangement, the authentication apparatus 1 executes various processes by way of the thinning section 21 and the characteristics extracting section 22 (FIGS. 5 and 9) on the video signal S2j or S20j (e.g., j=1 through 5) obtained as a result of image pickup operations performed on the blood vessels in a finger sequentially from different image pickup positions (FIG. 3) in response to the motion of the finger rolling along the curved surface of the finger from one of its lateral sides to the other and extracts characteristics of the blood vessels contained in the video signal S2j or S20j periodically as binary images IM1 through IM5 (FIG. 6).

Then, the authentication apparatus 1 detects the degrees of similarity C1 through C4 between the binary image that is the subject of current processing and the binary images that are the subjects of preceding processing for the binary images IM1 through IM5 and judges the continuity of the binary images according to if the degrees of similarity C1 through C4 are not smaller than the first threshold value or not.

Therefore, with the authentication apparatus 1, if a fraudulent image obtained by a fraudulent act of stealing biometric identification information is put on the image pickup camera CM of the authentication system, the fraudulent act does not have any continuity and it is not possible for the authentication apparatus to detect any continuity thereof so that it is possible to improve the reliability of binary images registered or collated as biometric identification information.

Additionally, with the authentication apparatus 1, images of blood vessels in a finger are obtained by shooting the blood vessels from different image pickup positions in response to the motion of the finger rolling along the curved surface of the finger from one of its lateral sides to the other. Thus, the arrangement of this embodiment is simple if compared with an arrangement where an image pickup camera CM is moved along the surface of a rigidly held finger. Additionally, since a finger is the subject of processing, the processing operation is less cumbersome to the user if compared with an arrangement where the user is required to roll an arm or a leg.

Still additionally, when a number of binary images are judged to show continuity, the authentication apparatus 1 does not directly register the binary images that show continuity but registers after a predetermined process in the blood vessel registration mode. More specifically, the authentication apparatus 1 detects the positional displacement quantities PS1 through PS4 (FIG. 6) of the binary image that is the subject of current processing and the binary images that are the subjects of preceding processing.

Then, if the binary image IM2 that is obtained second is the subject of current processing and the binary image IM1 that is obtained first is already temporarily registered, the authentication apparatus 1 aligns the binary images IM2 and IM1 according to the corresponding positional displacement quantity PS1 and subsequently detects the degree of similarity. Then, if the detected degree of similarity is not smaller than the second threshold value that is defined to be higher than the first threshold value, the authentication apparatus 1 temporarily registers the binary image IM2 that is the subject of current processing.

Thus, the authentication apparatus 1 can reliably judge the sameness of the blood vessels in binary images if compared with an arrangement of directly registering binary images that show continuity and hence can prevent the FAR from rising high. Then, as a result, the reliability of the binary images that are registered as biometric identification information is improved to a large extent.

Additionally, the authentication apparatus 1 detects the positional displacement quantities PS1 through PS4 (FIG. 6) according to the degree of similarity that provides a criterion for judging the presence or absence of continuity. In other words, the degree of similarity operates both as criterion for judging the presence or absence of continuity and criterion for detecting positional displacement quantities so that the overall configuration can be simplified so much.

Furthermore, the authentication apparatus 1 determines if the positional displacement quantity of the binary image that is the subject of current processing and the binary images that have already been temporarily registered is not smaller than the first displacement threshold value or not before aligning them. Then, it aligns the binary images when the positional displacement quantity is not smaller than the first displacement threshold value, whereas it selects the subject of current processing as the binary image to be processed next when the positional displacement quantity is smaller than the first displacement threshold value.

Thus, when the image pickup position corresponding to the binary image that is already temporarily registered and the image pickup position corresponding to the binary image that is the subject of current processing are practically not different from each other because the finger is sitting still or moved to roll very slowly, the authentication apparatus 1 can prevent a situation that the binary image that is the subject of current processing from being temporarily registered by error. Thus, it is possible to avoid registering a vast number of binary images as biometric identification information.

Additionally, the authentication apparatus 1 ends the registration process when the positional displacement quantity of the temporarily registered binary image that is the subject of current processing and the binary image that is temporarily registered first is not smaller than the second displacement threshold value. Thus, the authentication apparatus 1 can register a plurality of binary images for a predetermined quantity of movement.

Thus, with the above-described arrangement, if a fraudulent image obtained by a fraudulent act of stealing biometric identification information is put on the image pickup camera CM, it is possible to detect the fraudulent act to improve the reliability of the binary images that are registered or collated as biometric identification information. Thus, it is possible to realize a highly reliable authentication apparatus 1.

(6) Other Embodiments

While a finger is used as a site of biometric observation in the above-described embodiment, the present invention is by no means limited thereto and a palm, a toe, an arm, or an eye may alternatively used as a site of biometric observation.

While blood vessels are used as subject of biometric identification in the above-described embodiment, the present invention is by no means limited thereto and a fingerprint, a lip print or nerves may alternatively be used. When nerves are used, an idiosyncratic marker is injected into the body to make it possible to photograph the marker. Then, it is possible to use nerves as subject of biometric identification as in the case of the above-described embodiment.

While a finger is shot as it is rolled along the curved surface of thereof from one of its lateral sides to the other in the above-described embodiment, the present invention is by no means limited thereto and an image pickup camera CM may alternatively be turned around a finger that is rigidly held in position from one of the lateral sides to the other of the finger to shoot the finger. What is essential is that blood vessels in a finger are photographed sequentially at different image pickup positions according to the relative movement of the blood vessels and the image pickup element.

While an A/D conversion process, a profile extracting process, a binarization process and a thinning process are executed to extract characteristics of a subject of biometric identification from video signals in the above-described embodiment, the present invention is by no means limited thereto and alternatively the processes may be partly omitted or replaced or one or more than one new processes may be added. The sequence of execution of these processes may be changed appropriately.

While the obtained video signals are thinned at every predetermined period as a technique of extracting characteristics of a subject of biometric identification from video signals at every predetermined period in the above-described embodiment, the present invention is by no means limited thereto and alternatively the shutter speed of the image pickup camera CM (FIG. 1) may be changed and characteristics of a subject of biometric identification may be extracted from the video signals obtained sequentially from the image pickup camera CM. Still alternatively, the thinning section 21 may be omitted and characteristics of a subject of biometric identification may be extracted from the video signals at a period same as that of the image pickup operation of the image pickup camera CM.

While the degree of similarity and the positional displacement quantity of the binary image that is the subject of current processing and the binary image that is the subject of immediately preceding processing are detected in the above-described embodiment, the present invention is by no means limited thereto and alternatively the positional displacement quantity of the binary image that is the subject of current processing and not the subject of immediately preceding processing but simply a subject of preceding processing may be detected. Still alternatively, the positional displacement quantities of a binary image that is the subject of current processing and binary images that are subject of preceding processing may be detected. However, it is preferable to select a subject of preceding processing that is close to the subject of current processing when judging continuity. On the other hand, advantages similar to those of the above-described embodiment can be obtained by detecting the degree of similarity and the positional displacement quantity between of the binary images of the subject of current processing and the subject of next processing and judging continuity.

While all the binary images that are already used as subjects of processing and temporary registration before the binary image that is the subject of current processing are selected as subjects to be aligned with the binary image that is the subject of current processing in the above-described embodiment, the present invention is by no means limited thereto. Advantages similar to those of the above-described embodiment may be provided by using at least a binary image that is a subject of processing preceding the binary image that is the subject of current processing and selected as subject to be registered.

While the binary image that is the subject of current processing and the binary image that immediately precedes the first binary image and is already temporarily registered are aligned when they show a positional displacement not smaller than the first displacement threshold value in the above-described embodiment, the present invention is by no means limited thereto. Alternatively, the positional displacement quantity of the binary image that is the subject of current processing and not the subject of immediately preceding processing but simply a subject of preceding processing may be detected. Still alternatively, the positional displacement quantities of a binary image that is the subject of current processing and binary images that are subject of preceding processing may be detected. However, it is preferable to select a subject of preceding processing that is close to the subject of current processing.

While the continuity verifying section 23 that operates as first degree of similarity detection means and the sameness verifying section 25 that operates as second degree of similarity detection means computationally determine the degree of similarity of the binary image that is the subject of current processing and the binary image that is the subject of immediately preceding processing by means of the formula (1), the present invention is by no means limited thereto and any of various mutual correlation functions such as phase correlation function may alternatively be used.

While the authentication apparatus 1 of the above-described embodiment has an image pickup feature, a collation feature and a registration feature, the present invention is by no means limited thereto and the above-listed features may be realized respectively by separate apparatus.

The present invention can find applications in the field of biometrics authentication.

It should be understood by those skilled in the art that various modifications, combinations, sub-combinations and alternations may occur depending on design requirements and other factors insofar as they are within the scope of the appended claims or the equivalents thereof.

What is claimed is:

1. A registration apparatus comprising:
   extraction means for extracting characteristics of a subject of biometric identification at every predetermined period as a binary image on the basis of video signals output from an image pickup element as a result of picking up characteristics images of the subject of biometric identification at sequentially differentiated image pickup positions in response to a relative movement of the image pickup element and the subject of biometric identification at a predetermined biological site wherein:
the video signals output from the image pickup element may be comprised of multiple sources of biometric data; and
the characteristics images of the subject of biometric identification show biological components that are the subject of biometric identification shot successively at different image pickup positions;
first degree of similarity detection means for detecting a first degree of similarity between a binary image currently being processed and either a binary image processed immediately before the binary image currently being processed or a binary image to be processed which is located sequentially adjacent to the binary image currently being processed; and
registration means for registering the binary image currently being processed as biometric identification information when:
the first degree of similarity is not smaller than a first threshold value;
a first positional displacement quantity between the binary image currently being processed and the binary image processed immediately before the binary image currently being processed is not smaller than a first displacement threshold value;
the binary image currently being processed is aligned with temporarily registered binary images;
a correlation value of the aligned binary images is not smaller than a second threshold value; and
a second positional displacement quantity between a first binary image and the binary image currently being processed is not smaller than a second displacement threshold value.

2. The registration apparatus according to claim 1, wherein the registration means includes:
positional displacement quantity detection means for detecting the positional displacement quantity between the binary image currently being processed and the binary image processed immediately before the binary image currently being processed or the binary image to be processed located sequentially adjacent the binary image currently being processed;
alignment means for aligning a temporarily registered binary image processed before the binary image currently being processed and temporarily registered and the binary image currently being processed according to the positional displacement quantity between the temporarily registered binary image and the binary image currently being processed; and
second degree of similarity detection means for detecting a second degree of similarity among the aligned binary images and temporarily registering the binary image currently being processed as biometric identification information when the second degree of similarity is not smaller than a second threshold value that is defined to be greater than a first threshold value.

3. The registration apparatus according to claim 2, wherein the positional displacement quantity detection means detects the positional displacement quantity according to the degree of similarity detected by the degree of similarity detection means.

4. The registration apparatus according to claim 2, wherein the alignment means aligns the binary images when the positional displacement quantity between the temporarily registered binary image and the binary image currently being processed is not smaller than the first displacement threshold value but discards the binary image currently being processed and selects the sequentially adjacent temporarily registered binary image to be processed as a subject of current processing when the positional displacement quantity is smaller than the first displacement threshold value.

5. The registration apparatus according to claim 2, wherein the second degree of similarity detection means ends the registration when the positional displacement quantity between the binary image currently being processed and temporarily registered as biometric identification information and a temporarily registered first binary image is not smaller than the second displacement threshold value.

6. The registration apparatus according to claim 1, wherein the video signals output from the image pickup element are the results of image pickup operations performed sequentially at different image pickup positions relative to blood vessels at a side of a surface of a finger according to a relative movement of the blood vessels and the image pickup element.

7. A collation apparatus comprising:
extraction means for extracting characteristics of a subject of biometric identification at every predetermined period as binary images on the basis of the video signals output from an image pickup element as a result of picking up characteristics images of the subject of biometric identification at sequentially differentiated image pickup positions in response to a relative movement of the image pickup element and the subject of biometric identification at a predetermined biological site, wherein:
the video signals output from the image pickup element may be comprised of multiple sources of biometric data; and
the characteristics images of the subject of biometric identification show biological components that are the subject of biometric identification shot successively at different image pickup positions;
first degree of similarity detection means for detecting a first degree of similarity between a binary image currently being processed and either a binary image processed immediately before the binary image currently being processed or a binary image to be processed which is located sequentially adjacent to the binary image currently being processed for each of the extracted characteristics images; and
collation means for collating the binary image currently being processed in a plurality of registered binary images registered as biometric identification information when:
the first degree of similarity is not smaller than a first threshold value;
a first positional displacement quantity between the binary image currently being processed and the binary image proceed immediately before the binary image currently being processed is not smaller than a first displacement threshold value;
the binary image currently being processed is aligned with temporarily registered binary images;
a correlation value of the aligned binary images is not smaller than a second threshold value; and
a second positional displacement quantity between a first binary image and the binary image currently being processed is not smaller than a second displacement threshold value.

8. The collation apparatus according to claim 7, wherein the collation means includes:
positional displacement quantity detection means for detecting a first positional displacement quantity between the binary image currently being processed and each of the plurality of registered binary images when the first degree of similarity is not smaller than the first threshold value;
alignment means for aligning each of the plurality of registered binary images and the binary image currently being processed according to the respective first positional displacement quantities; and
second degree of similarity detection means for:
detecting a second degree of similarity of the aligned binary images; and
identifying the subject as the right person when a second degree of similarity is not smaller than the second threshold value that is defined to be greater than the first threshold value.

9. The collation apparatus according to claim 7, further comprising:
second positional displacement quantity detection means for detecting a second positional displacement quantity between the binary image currently being processed and the binary image processed immediately before the binary image currently being processed or the binary image to be processed after the binary image currently being processed, and
alignment means for aligning each of the plurality of registered binary images and the binary image currently being processed according to the respective first positional displacement quantities when:
the first degree of similarity is not smaller than the first threshold value and the second positional displacement quantity is not smaller than a second displacement threshold value but otherwise discarding the binary image currently being processed; and
selecting the binary image to be processed next as a subject of current processing when the degree of similarity is smaller than either the first threshold value or the first displacement threshold value.

10. The collation apparatus according to claim 9, wherein the second positional displacement quantity detection means detects the second positional displacement quantity according to the degree of similarity detected by the degree of similarity detection means.

11. The collation apparatus according to claim 9, wherein the second degree of similarity detection means ends the registration process when the positional displacement quantity between a binary image currently being processed and the first binary image processed is not smaller than the second displacement threshold value.

12. The collation apparatus according to claim 7, wherein the video signals output from the image pickup element are the results of image pickup operations performed sequentially at different image pickup positions relative to blood vessels at the side of a surface of a finger according to a relative movement of the blood vessels and the image pickup element.

13. A non-transitory computer-readable storage medium with an executable program stored thereon, wherein the program instructs a microprocessor to perform an extraction method comprising:
a first step of extracting characteristics of a subject of biometric identification at every predetermined period as binary images on the basis of video signals output from an image pickup element as a result of picking up characteristics images of the subject of biometric identification at sequentially differentiated image pickup positions in response to a relative movement of the image pickup element and the subject of biometric identification at a predetermined biological site, wherein:
the video signals output from the image pickup element may be comprised of multiple sources of biometric data; and
the characteristics images of the subject of biometric identification show biological components that are the subject of biometric identification shot successively at different image pickup positions;
a second step of detecting a degree of similarity between a binary image currently being processed and either a binary image processed immediately before the binary image currently being processed or a binary image to be processed which is located sequentially adjacent to the binary s image currently being processed for each of the extracted characteristics images; and
a third step of picking up the binary image currently being processed as a subject of registration or as a subject to be compared with the subject of registration when:
the degree of similarity is not smaller than a first threshold value;
a first positional displacement quantity between the binary image currently being processed and the binary image processed immediately before the binary image currently being processed is not smaller than a first displacement threshold value;
the binary image currently being processed is aligned with temporarily registered binary images;
a correlation value of the aligned binary images is not smaller than a second threshold value; and
a second positional displacement quantity between a first binary image and the binary image currently being processed is not smaller than a second displacement threshold value.

14. A non-transitory computer-readable storage medium with an executable program stored thereon, wherein the program instructs a microprocessor to perform the steps of:
extracting characteristics of a subject of biometric identification at every predetermined period as binary images on the basis of video signals output from an image pickup element as a result of picking up characteristics images of the subject of biometric identification at sequentially differentiated image pickup positions in response to a relative movement of the image pickup element and the subject of biometric identification at a predetermined biological site, wherein:
the video signals output from the image pickup element may be comprised of multiple sources of biometric data; and
the characteristics images of the subject of biometric identification show biological components that are the subject of biometric identification shot successively at different image pickup positions;
detecting a degree of similarity between a binary image currently being processed and either a binary image processed immediately before the binary image currently being processed or a binary image to be processed which is located sequentially adjacent to the binary image currently being processed for each of the extracted characteristics images; and
picking up the binary image currently being processed as a subject of registration or as a subject to be compared with the subject of registration when:

the degree of similarity is not smaller than a first threshold value;

a first positional displacement quantity between the binary image currently being processed and the immediately preceding binary image is not smaller than a first displacement threshold value;

the binary image currently being processed is aligned with temporarily registered binary images;

a correlation value of the aligned binary images is not smaller than a second threshold value; and a second positional displacement quantity between a first binary image and the binary image currently being processed is not smaller than a second displacement threshold value.

* * * * *